US006577634B1

(12) United States Patent
Tsukakoshi et al.

(10) Patent No.: US 6,577,634 B1
(45) Date of Patent: Jun. 10, 2003

(54) METHOD FOR SHARING NETWORK INFORMATION AND A ROUTER APPARATUS

(75) Inventors: Masato Tsukakoshi, Sagamihara (JP); Shinsuke Suzuki, Fujisawa (JP); Shigeki Morimoto, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/343,242

(22) Filed: Jun. 30, 1999

Related U.S. Application Data

(63) Continuation-in-part of application No. 09/195,707, filed on Nov. 19, 1998, now Pat. No. 6,049,524, and a continuation-in-part of application No. 09/190,437, filed on Nov. 13, 1998, now Pat. No. 6,496,510.

(30) Foreign Application Priority Data

Jul. 1, 1998 (JP) .......................................... 10-185921

(51) Int. Cl.$^{7}$ ............................................... H04L 12/28
(52) U.S. Cl. ................... 370/395.31; 370/351; 370/401
(58) Field of Search ......................... 370/238, 236–237, 370/395.3, 395.31, 401, 351, 465; 709/236–242, 201, 223, 224, 243

(56) References Cited

U.S. PATENT DOCUMENTS 5,461,624 A 10/1995 Mazzola
5,600,794 A 2/1997 Callon
5,802,316 A * 9/1998 Ito et al. ..................... 370/401
6,049,524 A * 4/2000 Fukushima et al. ......... 370/238
6,078,963 A * 6/2000 Civanlar et al. ............ 709/238
6,330,614 B1 * 12/2001 Aggarwal et al. .......... 709/236
6,421,731 B1 * 7/2002 Ciotti et al. ................ 709/242

* cited by examiner

*Primary Examiner*—Salvatore Cangialosi
(74) *Attorney, Agent, or Firm*—Antonelli, Terry, Stout & Kraus, LLP

(57) ABSTRACT

A highly-expandable router configuration technology which flexibly meets the need to increase lines as a network grows. A network information sharing unit is provided in a route calculation unit of each router in a clustered router. The network information sharing unit receives an update notification of network information collected by routing protocol units and sends this update information to all other routers in the clustered router as a network information notification packet. The network information sharing units in the receiving router notifies the routing protocol units of the contents of the received updated information. The routing protocol unit updates the network information thereof based on the notified contents, thereby allowing the network information obtained from all routers outside the clustered router to be shared and the clustered router to be recognized externally as a single router.

6 Claims, 14 Drawing Sheets

| | | |
|---|---|---|
| VERSION | PROTOCOL | COMMON HEADER |
| RESERVED | SPEAKER ID | |
| RESERVED | LENGTH | |
| DATA | | |

FIG. 6

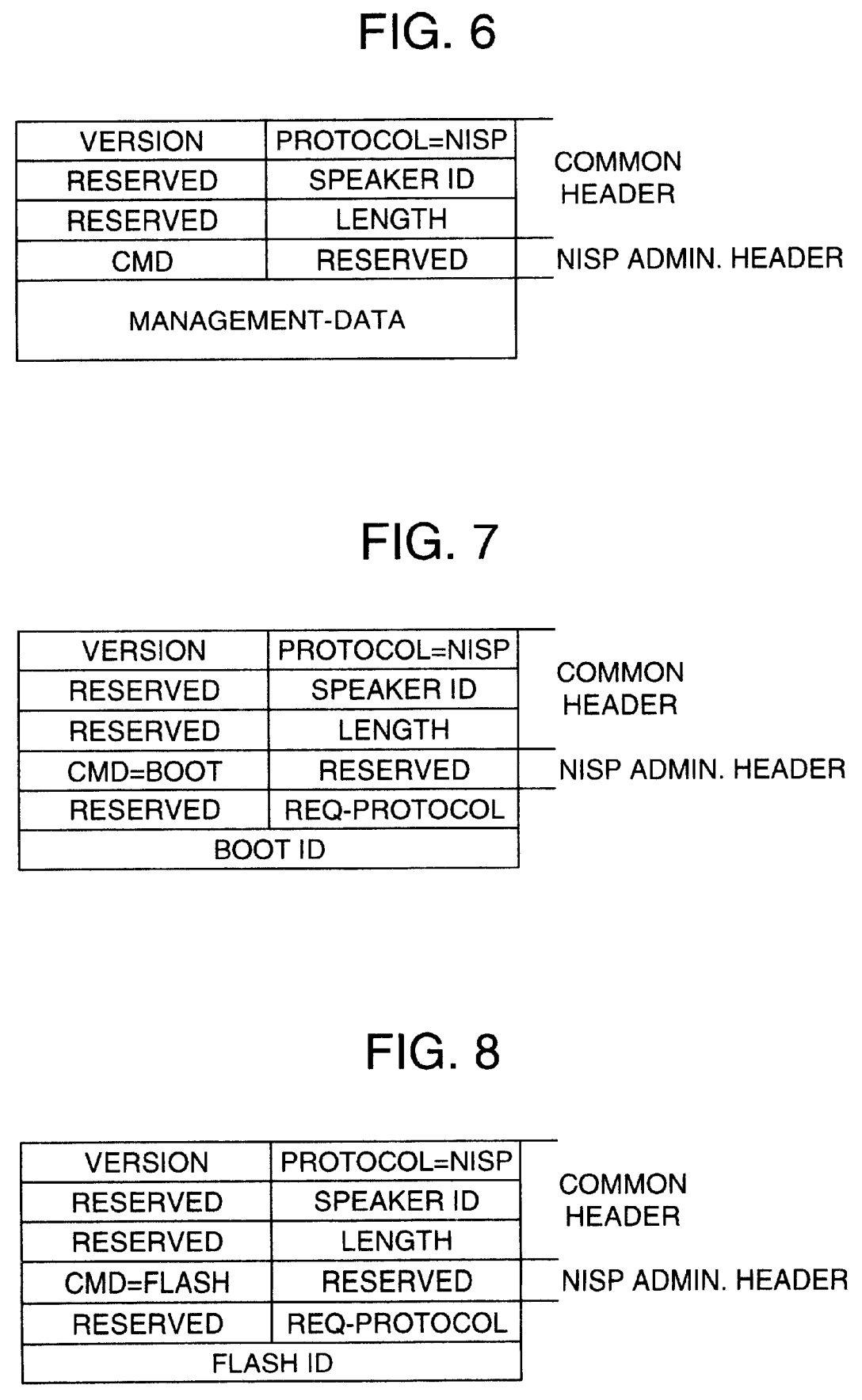

| | | |
|---|---|---|
| VERSION | PROTOCOL=NISP | COMMON HEADER |
| RESERVED | SPEAKER ID | |
| RESERVED | LENGTH | |
| CMD | RESERVED | NISP ADMIN. HEADER |
| MANAGEMENT-DATA | | |

FIG. 7

| | | |
|---|---|---|
| VERSION | PROTOCOL=NISP | COMMON HEADER |
| RESERVED | SPEAKER ID | |
| RESERVED | LENGTH | |
| CMD=BOOT | RESERVED | NISP ADMIN. HEADER |
| RESERVED | REQ-PROTOCOL | |
| BOOT ID | | |

FIG. 8

| | | |
|---|---|---|
| VERSION | PROTOCOL=NISP | COMMON HEADER |
| RESERVED | SPEAKER ID | |
| RESERVED | LENGTH | |
| CMD=FLASH | RESERVED | NISP ADMIN. HEADER |
| RESERVED | REQ-PROTOCOL | |
| FLASH ID | | |

METHOD FOR SHARING NETWORK INFORMATION AND A ROUTER APPARATUS

The present application is a CIP of patent application Ser. No. 09/195,707 filed Nov. 19, 1998, now U.S. Pat. No. 6,049,524, an a patent application Ser. No. 09/190,437 filed Nov. 13, 1998, now U.S. Pat. No. 6,496,510.

BACKGROUND OF THE INVENTION

The present invention relates to a network forwarding apparatus, and more particularly to a router apparatus having a routing protocol for generating a routing table used to determine the destination of a packet to be transferred between communication terminals.

A router which forwards packets between communication terminals must accommodate a large number of lines. Conventionally, when there is a need to increase the lines as the network grows, routers must be added to the network and a configuration definition must be created for each added router.

Because there is no definite means for establishing an association of a plurality of routers that were added, a routing protocol usually used to transfer packets to or from other terminals has been used to exchange information among the plurality of routers.

However, the prior art described above has the following problems.

First, when routers are added as the network grows, the network forwarding function is executed by the plurality of routers. The plurality of routers form a router network, which requires a subnet. This results not only in the waste of network addresses but also in the reduction of address space available to users.

Second, each independent router requires that the configuration be defined for it (configuration definition); for example, the network interface addresses or the routing protocol execution parameters must be defined for each router. This increases the network management cost not only at configuration definition change time but also at production run time.

Third, a routing protocol performs version verification, route exchanging priority determination, and so on in order to exchange network information with other routers. The load of this processing is large enough compared with that of actual network information exchange. Thus, the routing protocol is not suitable for network information exchange among the routers which are added as lines are added; that is, it is not suitable for network information exchange in a closed environment. In some cases, the routing protocol also decreases the performance of terminal-to-terminal packet forwarding processing which is the fundamental processing of routers. The above-mentioned prior art is referred to in the following publication, for example: (1) Thomas M. Thomas II "OSPF Network Design Solutions" Macmillan Technical Publishing pp. 129–202; (2) RFC:791 "INTERNET PROTOCOL DARPA INTERNET PROGRAM PROTOCOL SPECIFICATION" September 1981, Pages (i)–(iii); (3) RFC1058, C. Hedrick "Routing Information Protocol" June 1988, pp. 1–6; and (4) RFC2178, J. Moy "OSPF Version 2" July 1997, pp. 1–6.

SUMMARY OF THE INVENTION

To solve the above problems, it is an object of the present invention to provide a highly-expandable router configuration technology which flexibly meets the need to increase lines as a network grows.

To achieve the above object, an aspect of the present invention provides network information sharing means in each router to allow network information collected by routing protocols running in a plurality of routers to be shared. Sharing network information by the plurality of routers makes them externally appear as if they were a single virtual router. In the following description, this virtual router is called a clustered router.

The routing protocol running in each router in the clustered router exchanges network information with other routers outside the clustered router and, when its own network information changes, notifies the network information sharing means of the change.

The network information sharing means, when notified of the information, generates a network information notification packet containing a routing protocol identifier and sends the packet to all routers in the clustered router. Upon receiving the network information notification packet, the network information sharing means extracts update information from the received packet and sends the extracted update information to the corresponding routing protocol means in accordance with the routing protocol identifier.

When the routing protocol means receives the update information, it updates its own network information with the received information.

BRIEF DESCRIPTION OF THE DRAWINGS

FIG. 6 is a diagram showing the structure of a NISP management packet.

FIG. 7 is a diagram showing the structure of a NISP Boot packet.

FIG. 8 is a diagram showing the structure of a NISP Flash packet.

DESCRIPTION OF THE EMBODIMENTS

An embodiment of the present invention will be described below with reference to the drawings.

Figure 1:
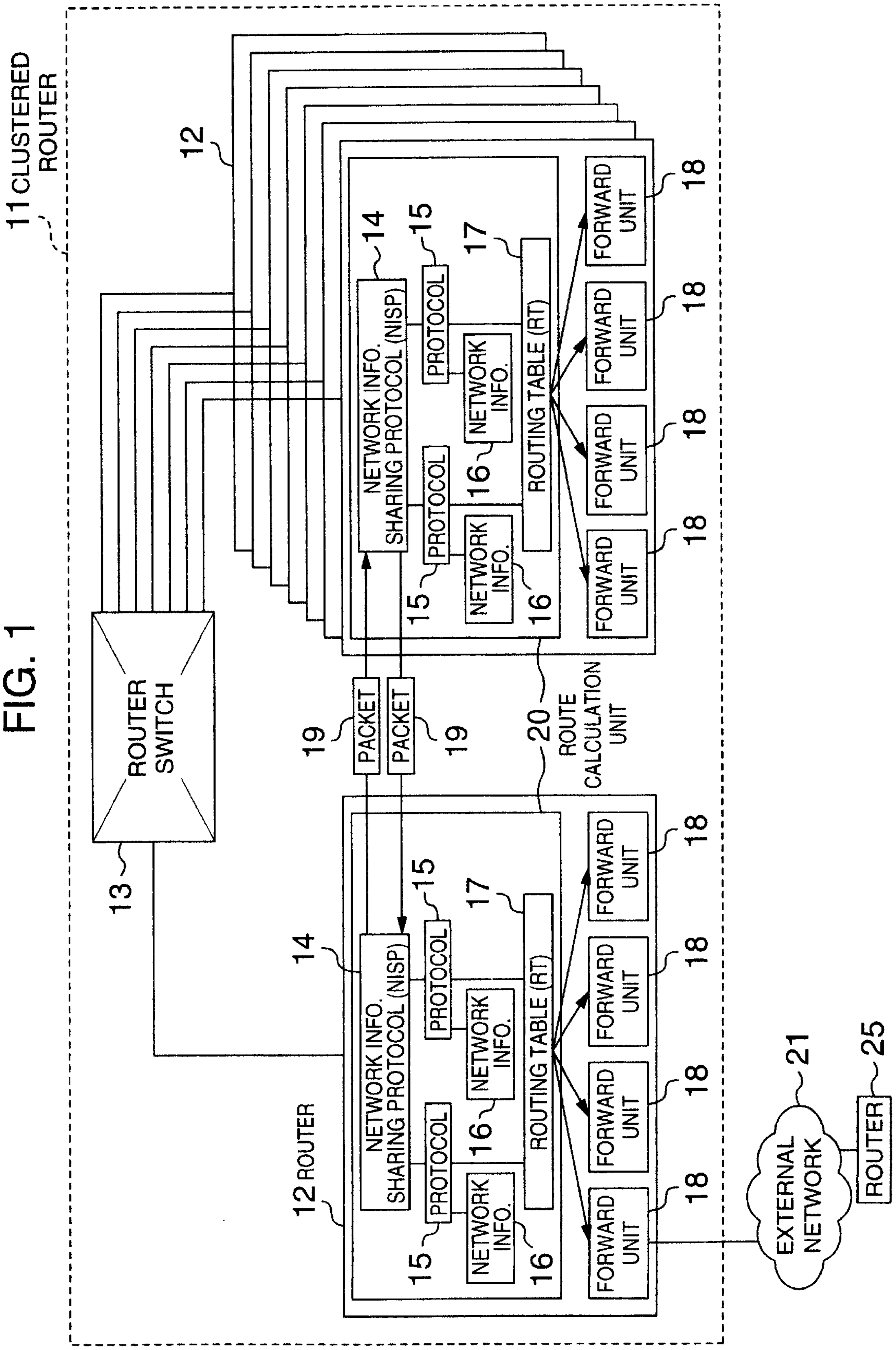
FIG. 1 is a diagram showing the configuration of a clustered router and the functional blocks of each router of the clustered router according to an embodiment of the present invention.

FIG. 1 shows the configuration of a clustered router according to the present invention and the functional blocks of each router constituting the clustered router. A clustered router 11 includes a plurality of routers each connected by a router-to-router switch 13. Each router 12 includes a route calculation unit 20 which generates and distributes a routing table used for forwarding packets and a plurality of forwarding unit 18 each of which forwards packets.

Within the route calculation unit 20 of each router 12 is provided two or more routing protocol means 15 which execute routing protocols. Each of the routing protocol means 15 sends or receives control packets to or from some other routers 25 on a network 21 outside the clustered router 11 to obtain network information 16. From the obtained network information 16, the routing protocol means 15 executes route calculation processing, generates terminal-to-terminal routing information, and adds this information to a routing table (RT) 17.

The routing table 17 generated as described above is distributed to the forwarding units 18 within the router 12 to decide whether to forward packets.

On the other hand, when the routing protocol means 15 updates the network information 16, it requests network information sharing means 14 to send the update information. In the following description, this network information sharing means 14 is described as NISP (Network Information Sharing Protocol) means 14. The NISP means 14 generates a network information notification packet 19 based on the update information and sends it to all other routers in the clustered router 11 through the router-to-router switch 13. This may be done either by sending a plurality of packets each with the destination of each destination router or by sending a single packet with the destination representing all routers. Taking into consideration that the plurality of routing protocol means 15 are running in the route calculation unit 20, the network information notification packet 19 described above has an identifier (routing protocol identifier) thereon indicating which routing protocol means has generated the update information the packet is now carrying.

The NISP means 14 of the destination router 12 receives the network information notification packet 19. The NISP means 14 checks the routing protocol identifier included in the received packet and sends the update information to the corresponding routing protocol means 15.

The routing protocol means 15 updates the network information 16 based on the update information sent from the NISP means 14.

Figure 2:
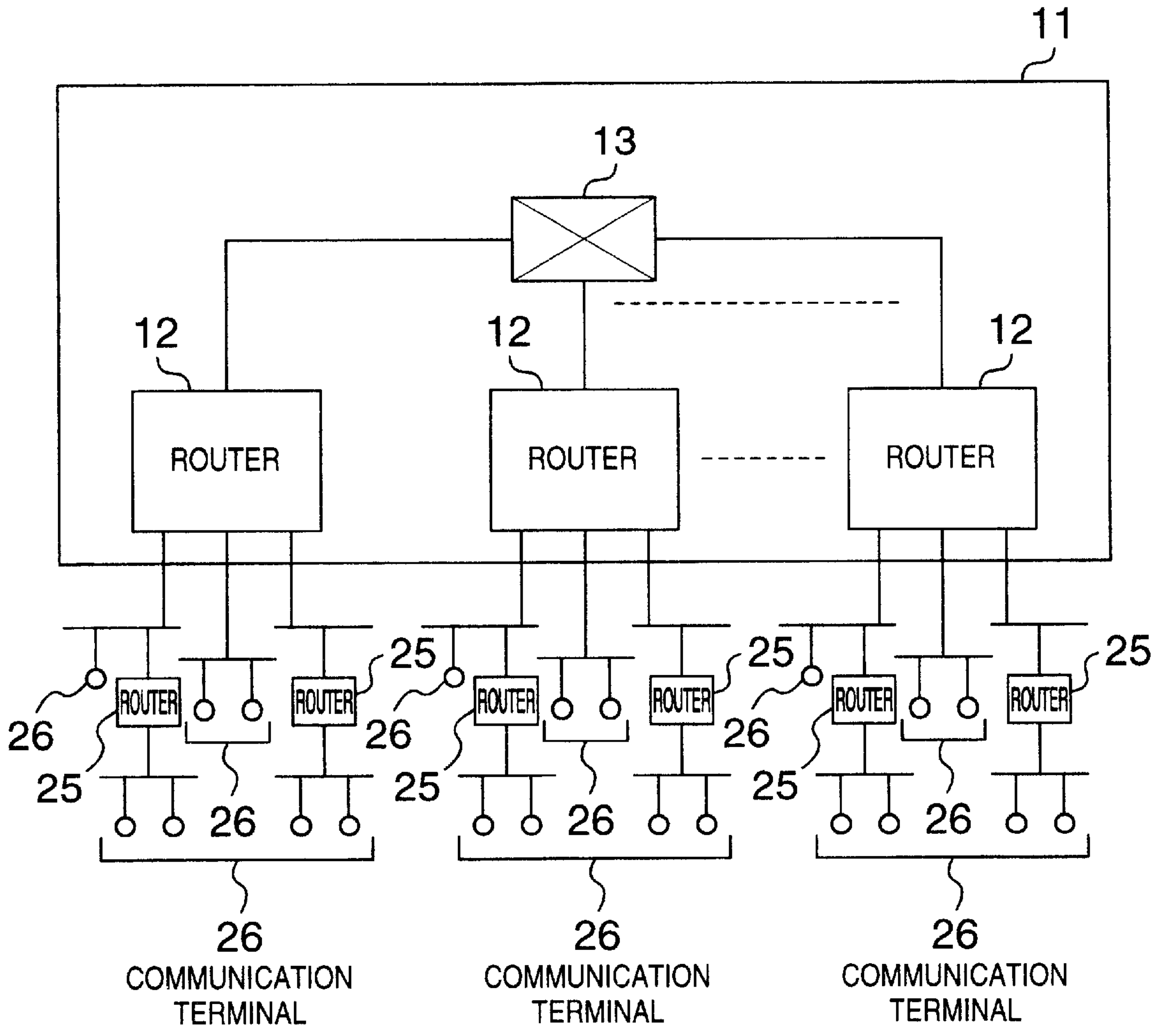
FIG. 2 is a diagram showing the network system configuration of the clustered router.

FIG. 2 shows the configuration of the network system using the clustered router 11. The clustered router 11, composed of the routers 12 and the router-to-router switch 13, is connected to communication terminals 26 and routers 25 functioning as network forwarding apparatus. The clustered router 11 appears to the communication terminals 26 and the other routers 25 as if it was a single network forwarding apparatus. The internal configuration of the clustered router 11 in which a plurality of routers 12 are provided is not visible externally. The router 25 sends or receives routing protocol packets to or from the clustered router 11 to obtain network information. The router 25 then generates the routing table of its own from the obtained network information for use in packet forwarding between the communication terminals 26.

The network information the router 25 receives from the clustered router 11 contains enough information for generating routing information used to send packets via the clustered router 11. Communication between the communication terminals 26 via the clustered router 11 is performed the same way communication between the communication terminals 26 via a single router is performed.

Figure 3:
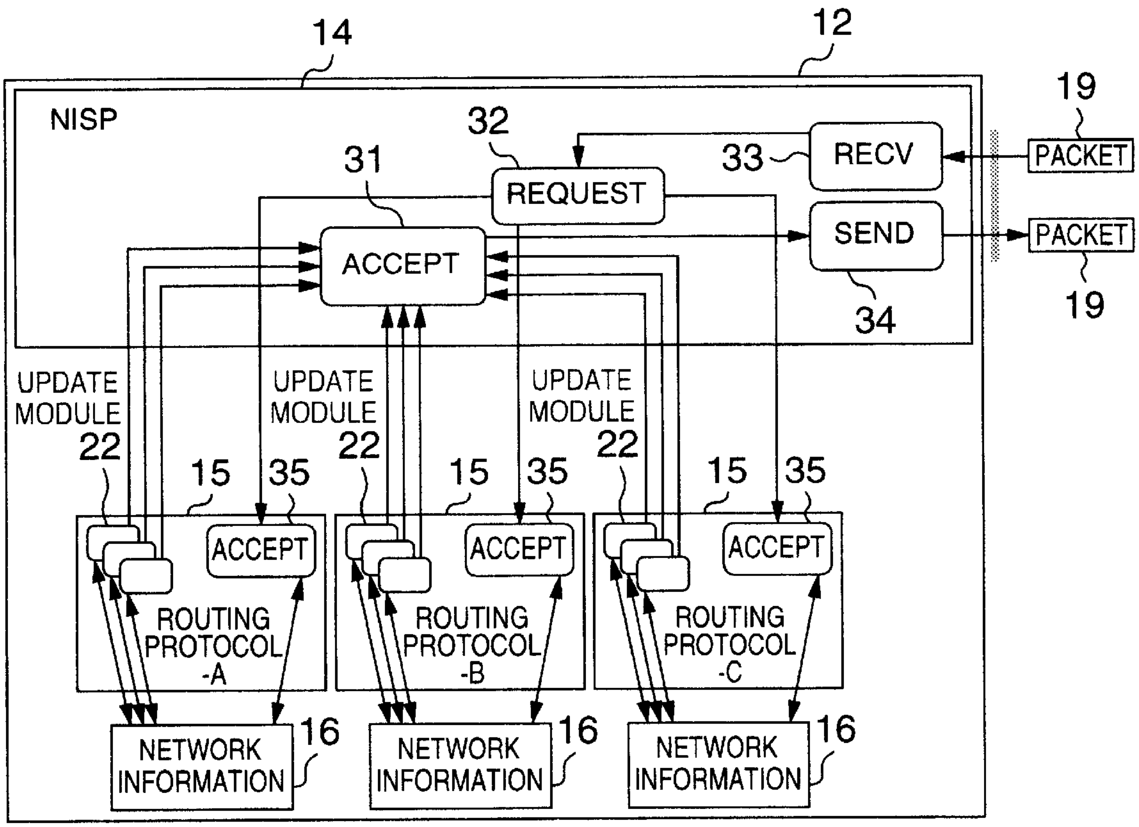
FIG. 3 is a diagram showing the module configuration of each router of the clustered router.

FIG. 3 is a diagram showing the configuration of the modules of the NISP means 14 and the routing protocol means 15. Each routing protocol means 15 updates the network information 16 by sending and receiving routing protocol packets. The routing protocol means 15 may contain a plurality of modules 22 which update the network information 16. Each of these modules directly starts an acceptance module 31 in the NISP means 14.

Upon receiving a request from the routing protocol means 15, the acceptance module 31 in the NISP means 14 creates the network information notification packet 19 based on the request information. After that, a sending module 34 is started for sending the network information notification packet 19.

When the network information notification packet 19 is received, a receiving module 33 is started. The receiving module 33 starts a requesting module 32 and passes the received network information notification packet 19 to it. Based on the routing protocol identifier included in the network information notification packet 19, the requesting module 32 starts an accepting module 35 in the corresponding routing protocol means 15.

The accepting module 35 in the routing protocol means 15 updates the network information 16 based on the received update information.

Figures 4, 5:
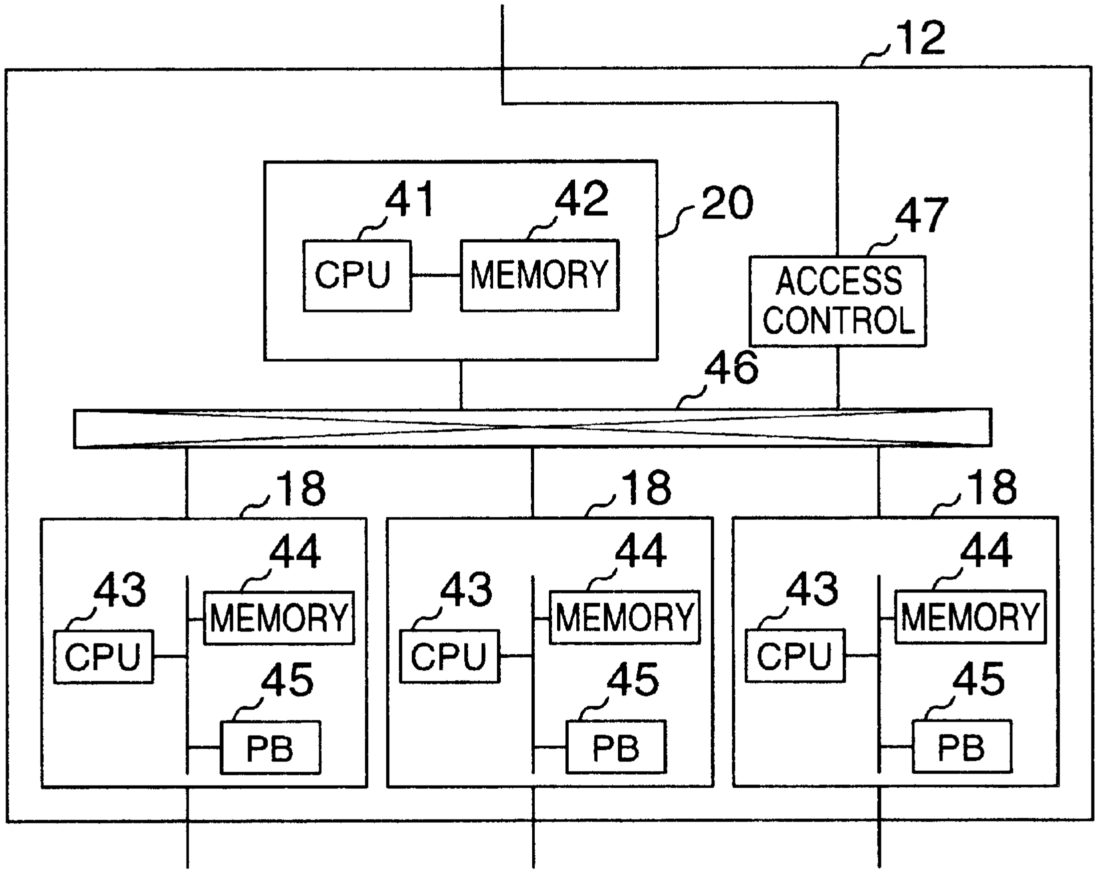
FIG. 4 is a diagram showing the hardware configuration of the router.
FIG. 5 is a diagram showing the structure of an NISP (network information sharing protocol) packet.

FIG. 4 shows the hardware configuration of the router 12. The router 12 includes the route calculation unit 20 and the forwarding units 18 connected by a router internal switch 46. The router 12 performs communication with other routers 12 via an inter-router switch access controller 47.

The route calculation unit 20 includes a route calculation processor 41 and a memory 42. The route calculation processor 41 sends or receives routing protocol packets to or from the routers 25 connected to the router 12, calculates the routing table, and distributes it to the forwarding units 18. The NISP means 14 and the routing protocol means 15 are implemented by the route calculation processor 41. The memory 42 stores the network information 16 and the routing table 17 therein.

The forwarding unit 18 includes a forwarding processor 43, a memory 44, and a packet buffer 45. The forwarding processor 43 determines whether to forward a packet between the communication terminals 26 and the output forwarding unit 18. The memory 44 contains the routing table, which is indispensable for packet forwarding, distributed from the route calculation unit 20. The packet buffer 45 temporarily contains packets received by the router 12. A packet determined to be forwarded is sent to the packet buffer 45 in the output forwarding unit 18. A packet determined not to be forwarded is erased form the packet buffer 45.

FIGS. 5 to 9 show the structure of packets sent or received by the NISP means 14. The packets shown in these figures include the network information notification packet 19 described above as well as the packet for managing the NISP means 14. Generically, these packets are called NISP packets.

FIG. 5 shows the general structure of a NISP packet. The NISP packet is divided roughly into the common header section and the data section. The common header section comprises a version field containing the NISP version information, a protocol field containing the routing protocol identifier, a speaker ID field identifying the NISP packet sender, and a length field indicating the entire length of the NISP packet. The data section comprises a data field describing information on the routing protocol to be executed by the routing protocol means 15 is stored.

In some cases, each router 12 of the clustered router 11 may turn on or off power independently (or may re-initialize itself for management). With this in mind, the following two functions are necessary.

The first function, called the boot function, is used by the router 12 during startup to obtain the network information 16 of other routers 12.

The second function, called the flash function, is used by the router 12 during shutdown to request other routers 12 to delete the network information 16 previously sent by the router 12 that is going to shut down.

The two functions described above maintain the integrity of the network information 16 among all routers 12 in the clustered router 11.

In addition, when the routing protocol being executed by the routing protocol means 15 is sometimes re-initialized for management purpose. This is done by re-initializing the routing protocol means 15. To do so, the functions described above are also required to obtain the network information 16 of the routing protocol from other routers 12 and to delete the network information 16 of the routing protocol from other routers 12.

To implement the boot function and the flash function described above, the NISP management packet are defined. FIG. 6 shows the structure of the NISP management packet. The protocol field of the common header section of the NISP management packet always contains the value indicating "NISP". The common header section is followed by the NISP administration header section and the management data section. The NISP administration header section includes the cmd field where the type of the management command is stored. The cmd field contains the value "Boot" or "Flash". The management data section includes the management-data field in which information defined for each management command is stored.

FIG. 7 shows the structure of the NISP Boot packet used to implement the boot function. The cmd field of the NISP administration header section contains the value indicating "Boot". The management-data section includes the req-protocol field and the boot ID field. The req-protocol field contains the type of the routing protocol executed by the routing protocol means 15 requesting the Boot function. The boot ID field contains the identifier indicating the Boot requester.

FIG. 8 shows the structure of the NISP Flash packet used to implement the flash function. The cmd field of the NISP administration header section contains the value indicating "Flash". The management-data section includes the req-protocol field and the flash ID field. The req-protocol field contains the type of the routing protocol executed by the routing protocol means 15 requesting the Flash function. The flash ID field contains the identifier indicating the Flash requester.

Figure 9:
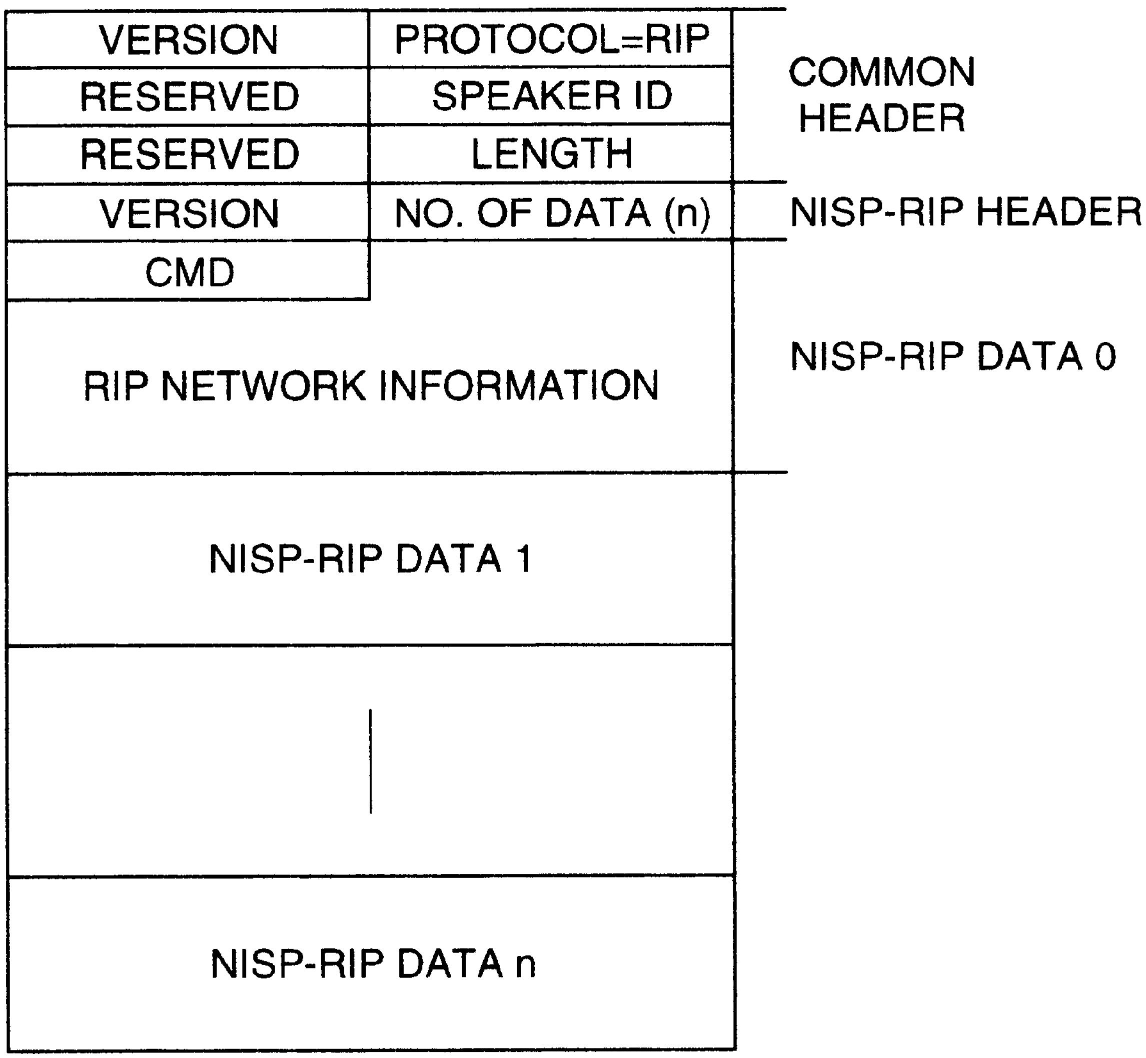
FIG. 9 is a diagram showing the structure of a NISP for RIP packet.

FIG. 9 shows an example of the network information notification packet 19. It shows the structure of a packet (called a NISP for RIP packet) used to carry the network information of RIP (Routing Information Protocol), one of routing protocols executed by the routing protocol means 15. The protocol field of the common header section of the NISP for RIP packet contains the value indicating "RIP". The common header section is followed by the NISP-RIP header section and the NISP-RIP data section. The information as the update information.

Upon receiving this transmission request 94, the NISP means 14 checks the routing protocol (routing protocol A) executed by the routing protocol means 15 that issued the transmission request 94, generates a network information notification packet 95 (the protocol field of the common header section indicates routing protocol A), and sends the generated network information notification packet 95 to the router 12 from which the NISP Boot packet was issued.

Upon receiving the network information notification packet 95 for routing protocol A, the NISP means 14 in the router 12, from which the NISP Boot packet was issued, selects the routing protocol means 15 for executing routing protocol A. This is because the protocol field of the common header section of the packet indicates routing protocol A. The NISP means 14 then sends an update information notification 96 to the selected routing protocol means 15.

When the routing protocol means 15 receives the update information notification 96, it adds this information to its own network information 16.

Figure 11:
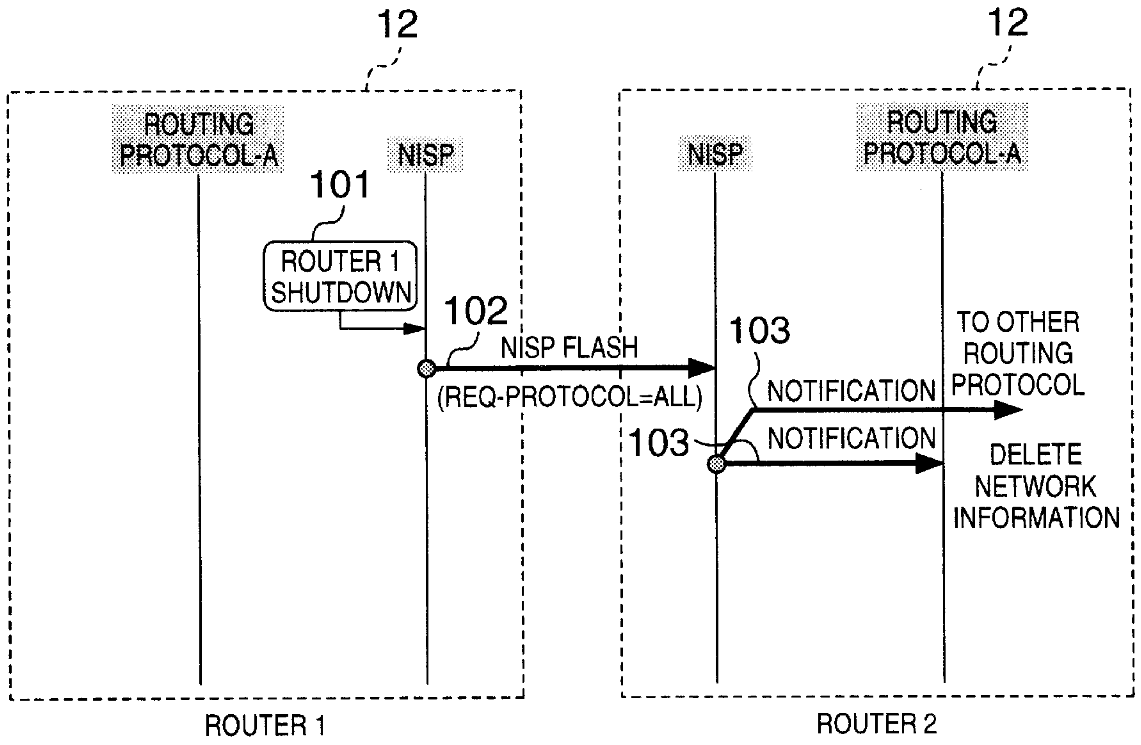
FIG. 11 is a diagram showing the operation sequence of the NISP Flash function.

FIG. 11 shows the operation sequence of the Flash function that is executed when the router 12 is shut down. When the router 12 is shut down (101), a NISP Flash packet 102 is generated during shutdown and is sent to all other routers 12. The req-protocol field of this NISP Flash packet 102 contains a value indicating all routing NISP-RIP header section includes the version field indicating the version of NISP for RIP and the No. of data field indicating the number of NISP-RIP data pieces included in the packet. The NISP-RIP data section includes a sequence of data units each composed of the cmd field indicating the type of command, such as "ADD" or "DEL", and network information collected by RIP. The network information collected by RIP includes the network address, the address of a router through which a packet must first arrive to reach the network, and so on.

Figure 10:
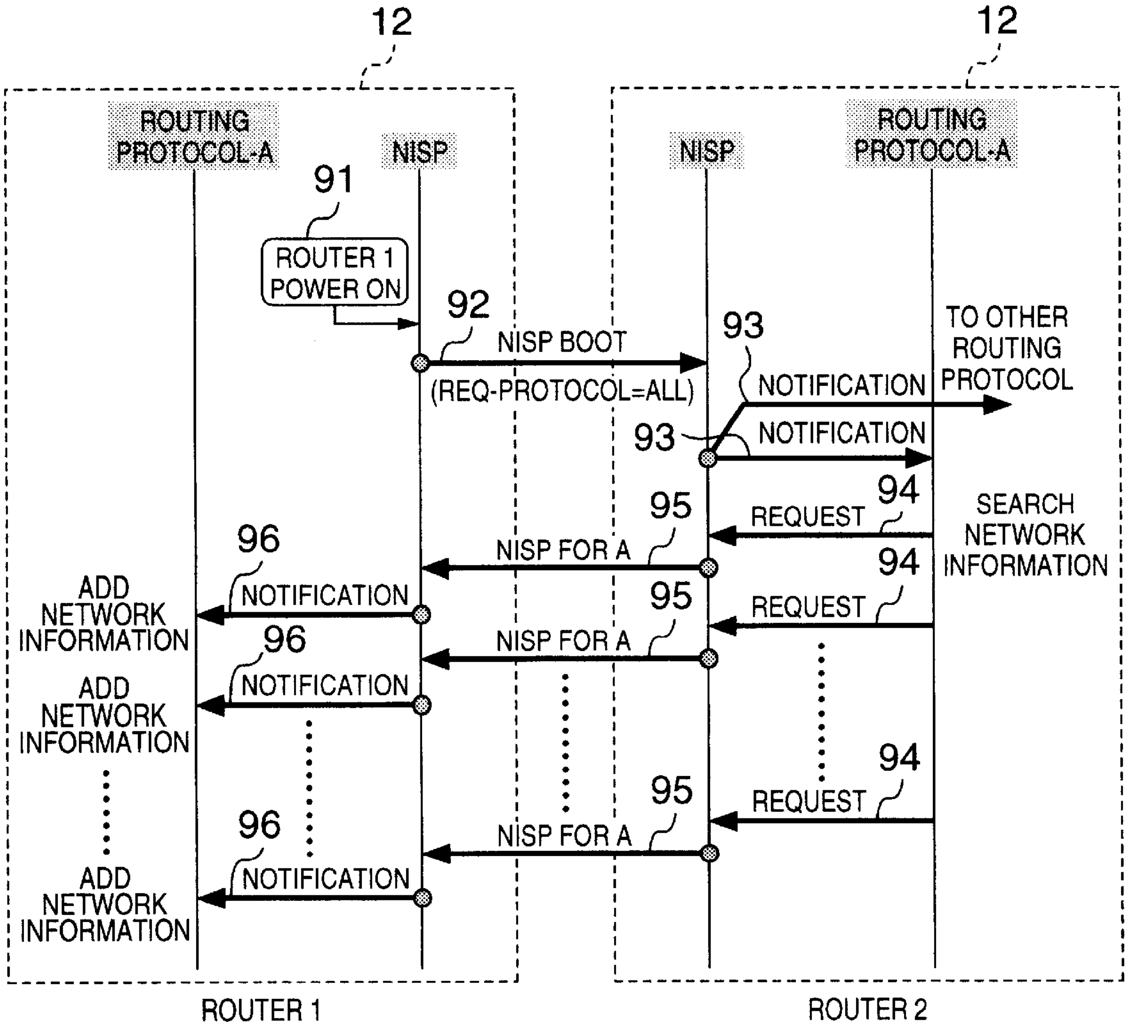
FIG. 10 is a diagram showing the operation sequence of the NISP Boot function.

FIG. 10 shows the operation sequence of the boot function that is executed when the router 12 is powered on. When the router 12 is powered on (91), a NISP Boot packet 92 is generated during initialization and is sent to all other routers 12. The req-protocol field of this NISP Boot packet 92 contains a value indicating all routing protocols.

When the NISP means 14 in the receiving router 12 receives this NISP Boot packet 92, it sends a Boot reception notification 93 to all routing protocol means 15 in that router because the req-protocol field contains the value indicating all routing protocols.

When routing protocol A, one of the routing protocol means 15 in the router 12, receives this Boot reception notification 93, it searches its own network information 16 for the network information other than that obtained through NISP packets, and sends a transmission request 94 to the NISP means 14 with the obtained protocols.

Upon receiving this NISP Flash packet 102, the NISP means 14 in the receiving router 12 sends a Flash reception notification 103 to all routing protocol means 15 in that router 12 because the req-protocol field contains the value indicating all routing protocols.

When routing protocol means 15 in the router 12 receives this Flash reception notification 103, it deletes from its own network information 16 only the information obtained from the NISP means 14 of the router 12 identified by the flash ID of the received packet.

Figure 12:
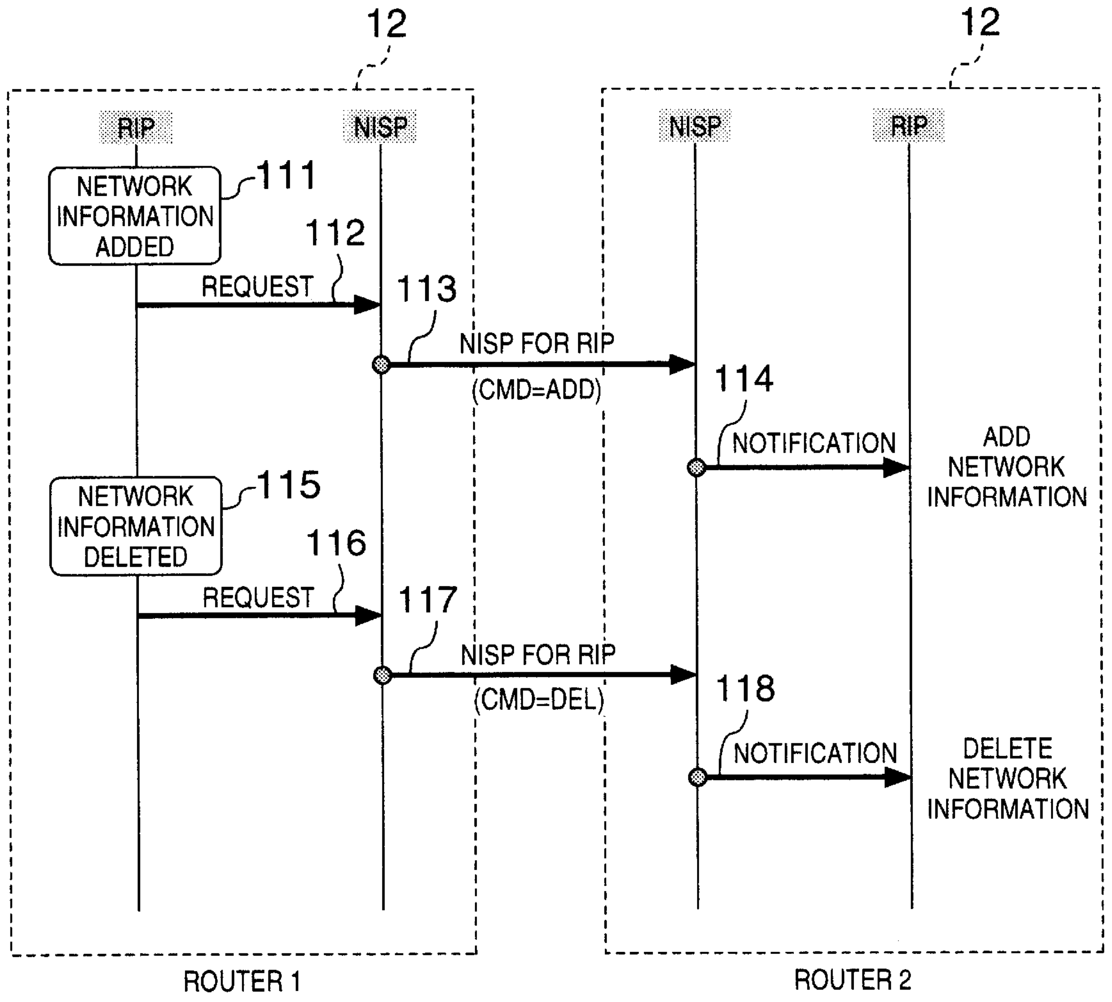
FIG. 12 is a diagram showing the operation sequence of NISP network information notification.

FIG. 12 shows how the network information 16 collected by the RIP is maintained when the RIP is used by the routing protocol means 15 as the routing protocol. When the network information 16 is added through execution of the RIP (111), the routing protocol means 15 sends a transmission request 112 to the NISP means 14 to send the update information.

When the NISP means 14 receives the transmission request 112, it generates a network information notification packet for the RIP 113 (the protocol field of the common header section indicates RIP) because the routing protocol executed by the requesting routing protocol means 15 is the RIP. The NISP means 14 then sends this packet to all other routers in the clustered router 11. At this time, the cmd field of the NISP for RIP data section shown in FIG. 9 indicates "ADD".

Because the protocol field of the common header section of the packet indicates the RIP, the NISP means 14 in the router 12 which has received the network information notification packet for the RIP 113 sends an update information notification 114 only to the routing protocol means 15 which execute the RIP.

Upon receiving the update information notification 114, the routing protocol means 15 for executing the RIP adds the received information to its own network information 16 because the cmd field of the packet indicates "ADD".

On the other hand, when network information is deleted from its own network information 16 through execution of the RIP (115), the routing protocol means 15 sends a transmission request 116 to the NISP means 14 to send the update information.

When the NISP means 14 receives the transmission request 116, it generates a network information notification packet for the RIP 117 because the routing protocol executed by the requesting routing protocol means 15 is the RIP. The NISP means 14 then sends this packet to all other routers 12 in the clustered router 11. At this time, the cmd field of the NISP for RIP data section indicates "DEL".

Because the protocol field of the common header section of the packet indicates the RIP, the NISP means 14 in the router 12 which has received the network information notification packet for the RIP 117 sends an update information notification 118 only to the routing protocol means 15 which execute the RIP.

The routing protocol means 15 for executing the RIP which has received the update information notification 118 deletes the received information from its own network information 16 because the cmd field of the packet indicates "DEL".

Figure 13:
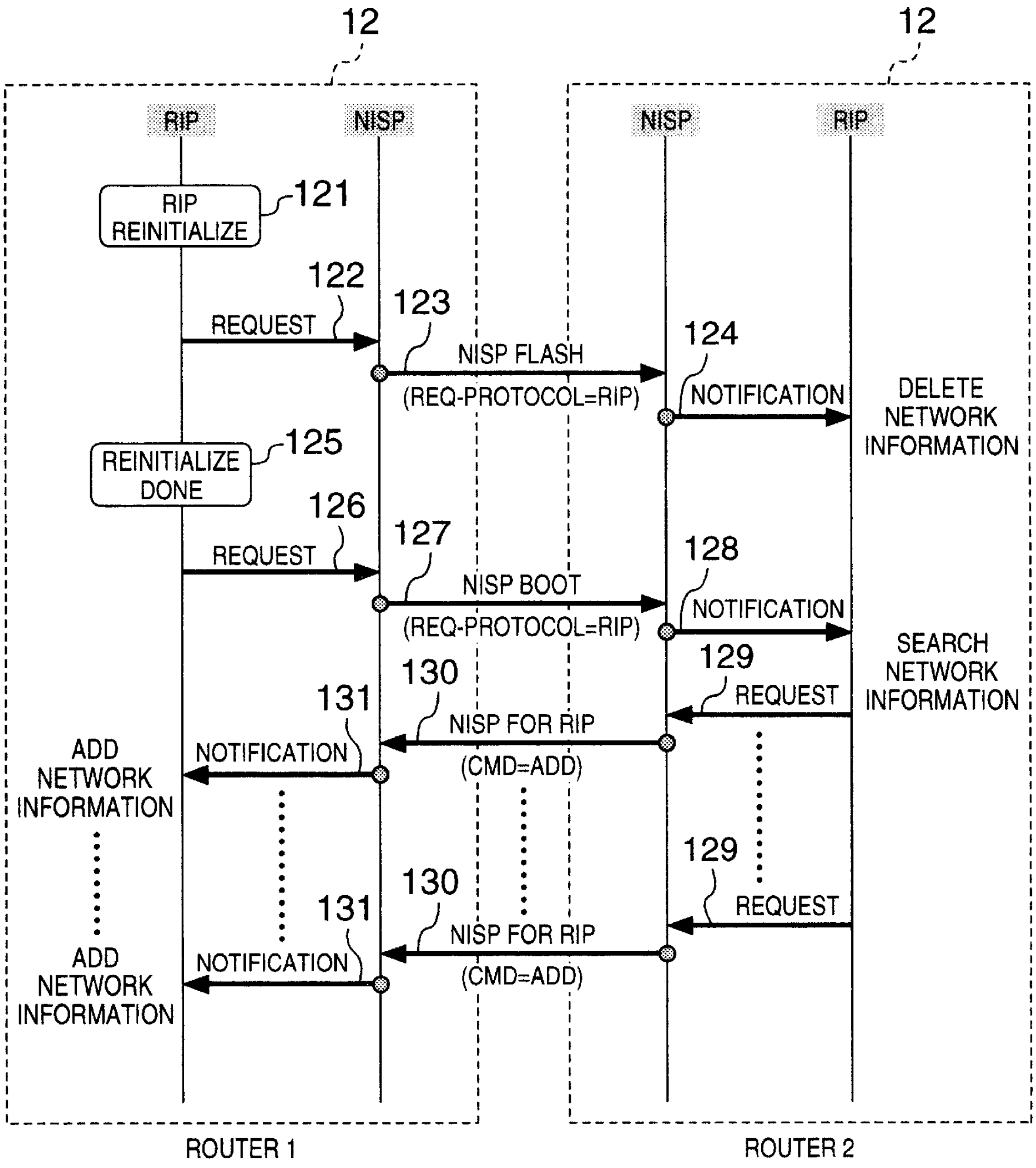
FIG. 13 is a diagram showing the operation sequence of the NISP Flash & Boot function that is performed during re-initialization of the routing protocol means 15.

FIG. 13 shows the operation sequence that is performed when the RIP is operating as the routing protocol executed by the routing protocol means 15 in the router 12 and when only that routing protocol means 15 is re-initialized. When a request 121 to re-initialize only the RIP is generated, the routing protocol means 15 sends a NISP Flash packet transmission request 122 to the NISP means 14 during RIP re-initialization of the routing protocol means 15.

Because the routing protocol of the requesting routing protocol means 15 is the RIP, the NISP means 14 which has received the NISP Flash packet transmission request 122 generates a NISP Flash packet 123 whose req-protocol field indicates the value RIP. The NISP means 14 then sends the generated packet to all other routers 12 in the clustered router 11.

The NISP means 14 in the receiving router 12 which has received the NISP Flash packet 123 sends a Flash reception notification 124 only to the routing protocol means 15 that executes the RIP, because the req-protocol field indicates RIP.

When the routing protocol means 15 that executes the RIP receives this Flash reception notification 124, it deletes only the information obtained from the NISP means 14 of the router 12 identified by the flash ID in the received packet.

When re-initialization is completed (125), the routing protocol means 15 that executes the RIP sends a NISP Boot packet transmission request 126 to the NISP means 14.

The NISP means 14 which has received the NISP Boot packet transmission request 126 generates a NISP Boot packet 127 whose req-protocol field indicates the value RIP, because the routing protocol of the requesting routing protocol means 15 is the RIP. The NISP means 14 then sends the generated packet to all other routers 12 in the clustered router 11.

The NISP means 14 in the router 12 which has received the NISP Boot packet 127 sends a Boot reception notification 128 only to the routing protocol means 15 that executes the RIP, because the req-protocol field indicates RIP.

When the routing protocol means 15 that executes the RIP receives this Boot reception notification 128, it searches its own network information 16 for the network information other than that obtained through NISP packet and sends a transmission request 129 to the NISP means 14 with the obtained network information as the update information.

The NISP means 14 which has received the transmission request 129 generates a network information notification packet for RIP 130 and sends it to the router 12 which issued the Boot packet, because the routing protocol of the requesting routing protocol means 15 is the RIP. At this time, the cmd field of the NISP for RIP data section indicates "ADD".

The NISP means 14 of the router 12 which has received the network information notification packet for RIP 130 sends an update information notification 131 only to the routing protocol means 15 which executes the RIP, because the protocol field of the common header section of the packet indicates RIP.

The routing protocol means 15 which executes the RIP and which has received the update information notification 131 adds this information to its own network information 16.

Figure 14:
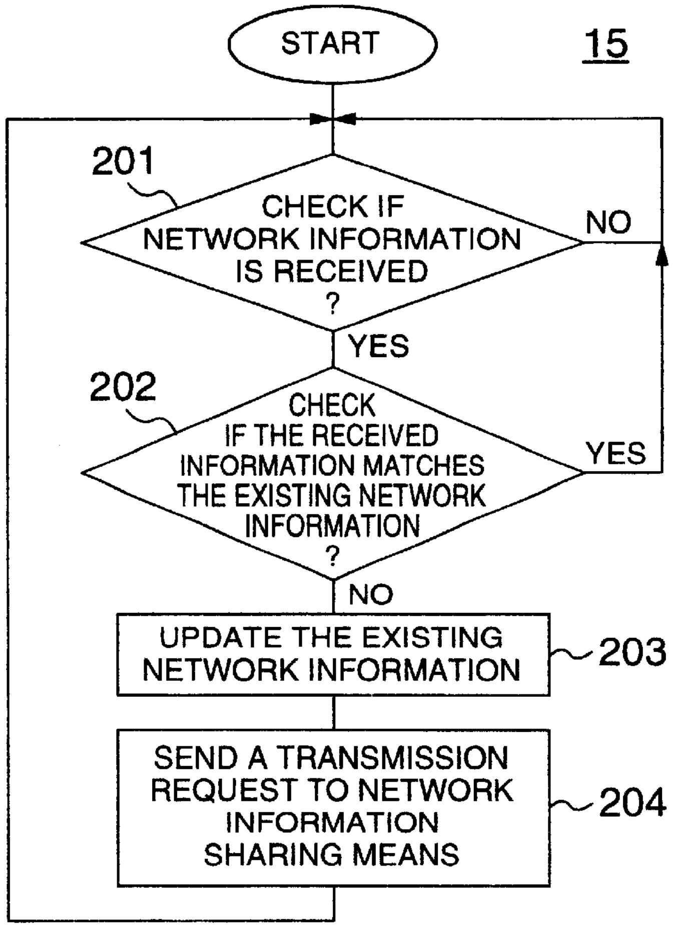
FIG. 14 is a diagram showing the operation sequence the routing protocol means.

FIG. 14 is a flowchart showing the operation of the routing protocol means 15. The routing protocol means 15 checks if it has received network information from a router external to the clustered router 11 (step 201). Upon receiving network information, the routing protocol means 15 checks if the received information matches the network information it has (step 202). If they match, there is no need to update the network information; if they do not match, that is, when the existing information is updated or deleted or when new information is added, the routing protocol means 15 updates the network information (step 203). After that, the routing protocol means 15 requests the NISP means 14 to transmit the update information (step 204) and passes control back to step 201 to check if new network information is received.

Figure 15:
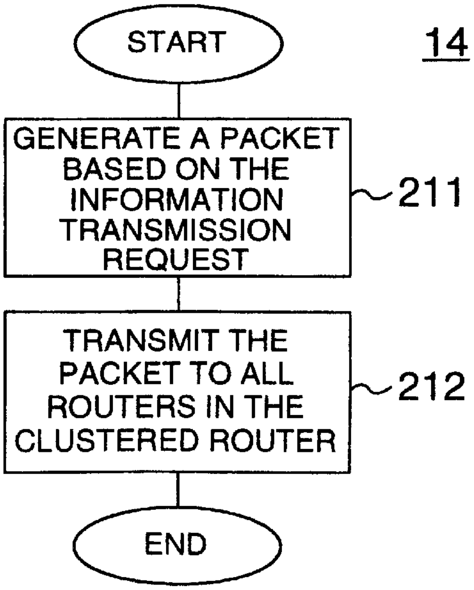
FIG. 15 is a flowchart showing the packet transmission operation of the NISP means.

FIG. 15 is a flowchart showing the operation that is executed by the NISP means 14 when the update information transmission request is received. The NISP means 14 creates a network information notification packet based on the information transmission request (step 211), transmits the packet to other routers 12 in the clustered router 11 (step 212), and ends the operation.

Figure 16:
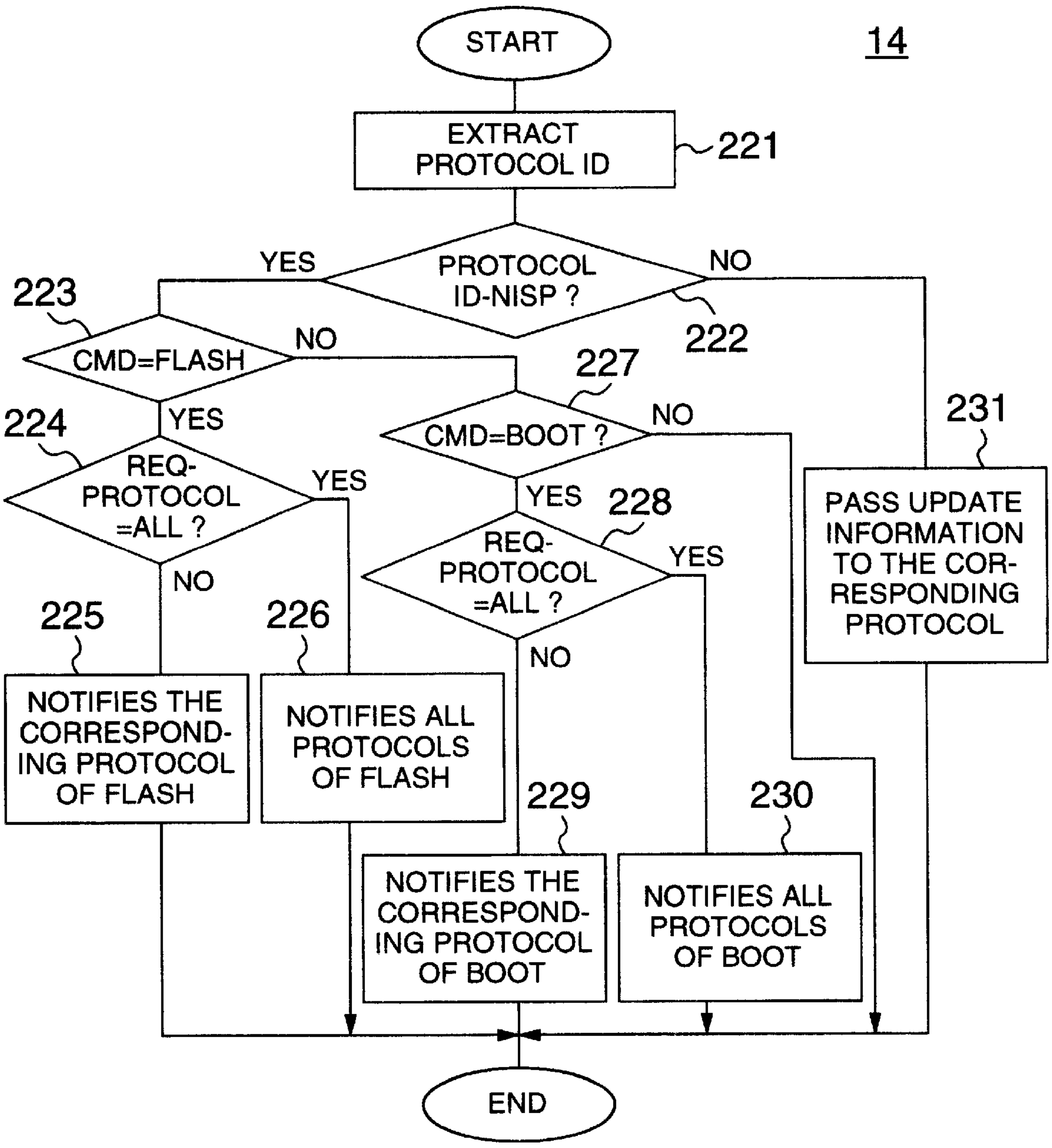
FIG. 16 is a flowchart showing the packet reception operation of the NISP means.

FIG. 16 is a flowchart showing the operation executed by the NISP means 14 when the network information notification packet is received from some other router 12. First, the NISP means 14 extracts the protocol field from the common header (step 221) and checks to see if the extracted protocol field indicates NISP (step 222). If the extracted protocol field does not indicate NISP, the NISP means 14 passes the update information to the routing protocol means 15 which executes the routing protocol specified by the protocol field (step 231) and ends the operation.

If the extracted protocol field indicates NISP, that is, when the packet is the NISP management packet, the NISP means 14 checks if the cmd field of the NISP management header indicates Flash (step 223).

If the cmd field of the NISP management header indicates Flash (step 223:Yes), the NISP means 14 checks if the req-protocol field contains a value indicating all routing protocols (step 224). If the field contains a value indicating all routing protocols, the NISP means 14 notifies all routing protocol means 15 of Flash (step 226); otherwise, the NISP means 14 notifies the corresponding routing protocol means 15 of Flash (step 225). Then, the NISP means 14 ends the operation.

If the cmd field of the NISP management header does not indicate Flash (step 223:NO), the NISP means 14 checks if the cmd field indicates Boot (step 227).

If the cmd field of the NISP management header indicates Boot (step 227:YES), the NISP means 14 checks if the req-protocol field contains a value indicating all routing protocols (step 228). If the req-protocol field contains that value, the NISP means 14 notifies all routing protocol means 15 of Boot (step 230); otherwise, the NISP means 14 notifies the corresponding routing protocol means 15 of Boot (step 229). Then, the NISP means 14 ends the operation.

If the cmd field of the NISP management header does not indicate Boot (step 227:NO), the NISP means 14 ends the operation.

Figure 17:
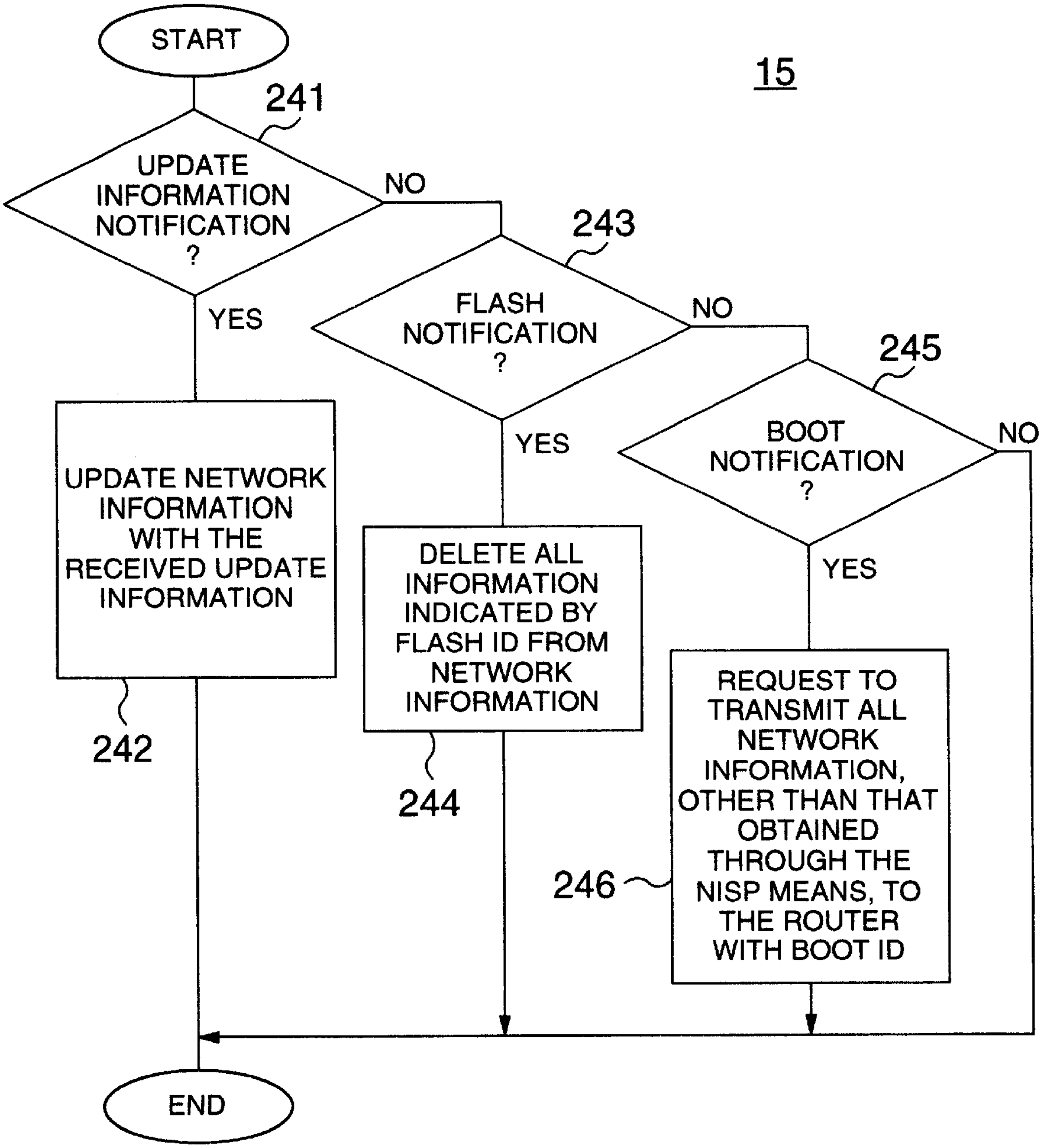
FIG. 17 is a flowchart showing another operation of the routing protocol means.

FIG. 17 is a flowchart showing the operation executed by the routing protocol means 15 when it receives a notification from the NISP means 14. First, the routing protocol means 15 checks if the notification is an update information notification (step 241). If the notification from the NISP means 14 is an update information notification (step 241:YES), the routing protocol means 15 updates its own network information 16 with the received update information (step 242). If the notification from the NISP means 14 is not an update information notification (step 241:NO), the routing protocol means 15 checks if the notification is a Flash notification (step 243).

If the notification from the NISP means 14 is a Flash notification (step 243:YES), the routing protocol means 15 deletes all information, received from the NISP means 14 of the router 12 identified by the flash ID field of the NISP Flash packet, from its network information 16 (step 244). If the notification from the NISP means 14 is not a Flash notification (step 243:NO), the routing protocol means 15 checks if the notification is a Boot notification (step 245).

If the notification from the NISP means 14 is a Boot notification (step 245:YES), the routing protocol means 15 requests the NISP means 14 to transmit all network information other than that obtained through the NISP means 14 to the NISP means 14 of the router 12 identified by the boot ID field of the NISP Boot packet (step 246). Then, the routing protocol means 15 end the operation. If the notification from the NISP means 14 is not a Boot notification (step 245:NO), the routing protocol means 15 end the operation.

Figure 18:
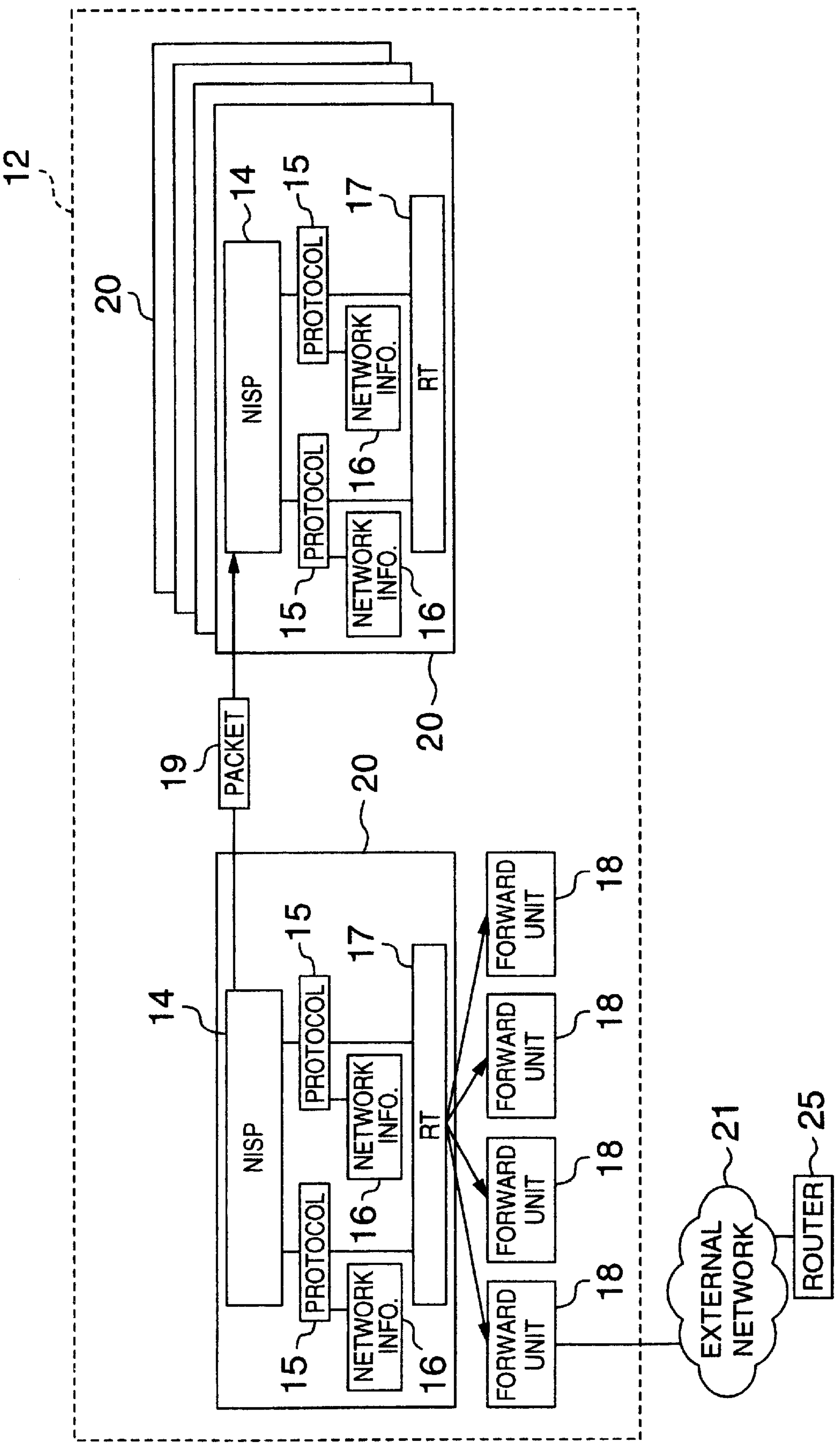
FIG. 18 is a diagram showing the functional blocks according to another embodiment of the present invention.

FIG. 18 is a functional block diagram of the second embodiment according to the present invention. The router 12 comprises the plurality of route calculation units 20 each of which generates and distributes the routing table used for packet forwarding and the plurality of forwarding processing units 18 each of which forwards packets. Only one of the plurality of route calculation units 20 is in the active state, and the rest are in the backup state. Though the router 12 is one element of the clustered router 11 in this figure, the present invention is not limited to this configuration. The router may exist alone.

Within the active-state route calculation unit 20, the routing protocol means 15 is operating. The routing protocol means 15 sends or receives control packets to or from some other router 25 on a network outside the router 12 to obtain the network information 16. From the obtained network information 16, the routing protocol means 15 performs route calculation to generate routing information and adds this information to the routing table 17.

The routing table 17 thus generated is distributed to the forwarding units 18 in the router 12 to decide whether to forward packets.

The routing protocol means 15 in the backup-state route calculation unit 20 does not send or receive packets to or from some other router 25, nor does it distribute the routing table 17 to the forwarding unit 18.

After updating the network information 16, the routing protocol means 15 in the active-state route calculation unit 20 requests the NISP means 14 to send the update information. The NISP means 14 generates the network information notification packet 19 based on this update information and then sends it to all backup-state route calculation units 20. Because there are the plurality of routing protocol means 15 in the route calculation unit 20, the network information notification packet 19 has the identifier (routing protocol identifier) thereon to indicate which routing protocol has generated the update information.

The NISP means 14 in the backup-state route calculation unit 20 checks the routing protocol identifier in the received packet and passes the update information to the routing protocol means 15 of the corresponding type.

The routing protocol means 15 in the backup-state route calculation unit 20 updates the network information 16 based on the update information received from the NISP means 14. At this time, the routing protocol means 15 may or may not generate routing information from the updated network information 16. If the routing protocol means 15 does not generate the routing information at this time, it generates new routing information when the corresponding route calculation unit 20 enters the active-state and then creates the routing table 17.

The operation described above keeps the network information 16 of the backup-state route calculation unit 20 up-to-date. Therefore, when the active-state route calculation unit 20 fails and the backup-state route calculation unit 20 enters the active-state, the route calculation unit 20 does not have to obtain the network information 16 from some other router 25, thus minimizing the influence of an error (such as loss of packets between communication terminals).

When the router 12 is an element of the clustered router 11, the network information 16 may be shared by combining the configuration in FIG. 1 and that in FIG. 18. That is, the network information notification packet 19 may be sent to all other route calculation units 20 in the same router 12 and to all route calculation units 20 in other routers 12 in the clustered router 11.

According to the present invention, network information collected by the routing protocol in each router in a clustered router is sent to other routers in the clustered router. This makes it possible for all routers in the clustered router to share the network information.

Sharing network information as described above makes a clustered router, composed of a plurality of routers, appear as if it was a single router.

Conventionally, more routers must be added as the network grows and the resulting router networks require additional network addresses. The present invention allows the user to treat the router connections in the clustered router as internal networks, eliminating the need to assign network addresses to them. This avoids waste of network addresses and increases address space available to the user.

In the conventional system, there is a need to perform configuration definition for each router. The clustered router, which is configured as a single router, eliminates that need, significantly reducing the network management cost.

In addition, network information exchange among the routers in the clustered router is performed in a simpler method which does not use routing protocols. This ensures the performance of terminal-to-terminal packet forwarding which is the primary function of routers.

What is claimed is:

1. A clustered router apparatus connected to a network, said clustered router apparatus comprising a plurality of routers, each of said plurality of routers being connected to an external network and said plurality of routers constituting one router logically for another apparatus connected to said external network, said plurality of routers being connected with each other through routes different from said network, each of said plurality of routers comprising:

routing protocol means for executing a routing protocol to generate a routing table used to decide a forwarding destination of a packet to be relayed; and network information processing means for performing a processing which makes the other routers within the clustered router apparatus have identical network information for generating said routing table by said routing protocol means;

the network information processing means of one of said plurality of routers providing an instruction packet for instructing a processing for making the other routers have said network information and transferring said instruction packet to the other routers through said different routes; and the network information processing means of the other routers instructing a processing according to the content of said instruction packet to said routing protocol means within the corresponding other routers.

2. The apparatus according to claim 1, wherein each routing protocol means in one of said routers requesting transfer of updated information to said network information processing means in response to updating of the network information as a result of a protocol processing by the routing protocol means;

said network information processing means generating a network information notification packet notifying said updated information as said instruction packet and transferring the generated network information notification packet to the other routers, and the network information processing means in the other routers receiving the network information notification packet and instructing a processing according to said updated information to the routing protocol means.

3. The apparatus according to claim 2, wherein said router comprises a plurality of routing protocol units, said network information notification packet including an identifier for identifying a routing protocol, and said network information processing means instructing a processing to a routing protocol identified by said identifier.

4. The apparatus according to claim 2, wherein said instruction packet indicates a boot packet requiring to acquire network information held by another router in response to a start of the router or a management packet composed of a flash packet requesting deletion of a network information previously notified in response to a stop of operation of the relevant router.

5. The apparatus according to claim 4, wherein each routing protocol unit of said router transfers said management packet to the other routers, and the network information processing means of the other routers instructing a processing according to the content of the management packet to at least one routing protocol unit in the corresponding router.

6. The apparatus according to claim 5, wherein when said management packet is said boot packet, said at least one routing protocol unit of said other router requests a transfer of network information held by the corresponding routing protocol unit according to an instruction based on said boot packet, to said network information processing means;

said network information processing means transferring the requested network information to a corresponding router which is a transfer source of said boot packet; and the network information processing means of the corresponding router which is a transfer source of said boot packet transferring the transferred network information to a routing protocol unit within the corresponding router.

* * * * *